United States Patent
Jan et al.

(10) Patent No.: US 7,548,672 B2
(45) Date of Patent: Jun. 16, 2009

(54) FIBER-BASED LIGHT SOURCE DEVICE

(75) Inventors: Huang-Tzung Jan, Dasi Township, Taoyuan County (TW); Ruey-Nan Yeh, Taoyuan (TW)

(73) Assignee: Chung Shan Institute of Science and Technology, Taoyuan County (TW)

( * ) Notice: Subject to any disclaimer, the term of this patent is extended or adjusted under 35 U.S.C. 154(b) by 365 days.

(21) Appl. No.: 11/645,557

(22) Filed: Dec. 27, 2006

(65) Prior Publication Data

US 2008/0158902 A1 Jul. 3, 2008

(51) Int. Cl.
*G02B 6/26* (2006.01)
*G02B 6/00* (2006.01)
*G02F 1/1335* (2006.01)
*G03B 21/26* (2006.01)

(52) U.S. Cl. .................. 385/42; 385/115; 385/116; 385/901; 362/551; 362/555; 362/561; 349/5; 353/31; 353/34

(58) Field of Classification Search ............ 385/41, 385/42, 46, 115, 116, 120, 147, 901; 349/5, 349/6, 7; 353/31, 39, 34; 362/551, 555, 362/561

See application file for complete search history.

(56) References Cited

U.S. PATENT DOCUMENTS

| | | | | |
|---|---|---|---|---|
| 4,620,266 A * | 10/1986 | Baumann et al. | ............ | 362/551 |
| 6,224,216 B1 * | 5/2001 | Parker et al. | ............ | 353/31 |
| 6,547,400 B1 * | 4/2003 | Yokoyama | ............ | 353/98 |
| 6,865,309 B2 * | 3/2005 | Dho | ............ | 385/15 |
| 7,131,735 B2 * | 11/2006 | Yokoyama | ............ | 353/98 |
| 2003/0223046 A1 * | 12/2003 | Dho | ............ | 353/31 |

* cited by examiner

*Primary Examiner*—Brian M Healy
(74) *Attorney, Agent, or Firm*—Rosenberg, Klein & Lee

(57) ABSTRACT

The present invention provides a fiber-based light source device, which includes a plurality of first, second or third light-emitting devices for respectively emitting a plurality of first, second or third lights, a plurality of first, second or third directional couplers for respectively coupling the first, second or third lights in their order so as to generate a first, second or third coupled light, a fourth directional coupler for coupling the first coupled light and the second coupled light so as to generate a fourth coupled light, and a fifth directional coupler for coupling the third coupled light and the fourth coupled light so as to generate an output light source. With coupling light beams from light-emitting devices and switching of those light-emitting devices in a sequential manner, the energy loss could be minimized and good heat dissipation could be obtained.

13 Claims, 3 Drawing Sheets

FIBER-BASED LIGHT SOURCE DEVICE

BACKGROUND OF THE INVENTION

1. Field of the Invention

The present invention relates to a light source device, and more particularly, to a fiber-based light source device where the fiber is for guiding the light, for providing a uniform light source.

2. Description of the Prior Art

With the electro-optical transfer efficiency and strength of modern semiconductor light-emitting devices gradually increasing plus prevalence of the concept of environment protection/preservation, the demand for electronic devices with lower power consumption is continuing to increase. Because semiconductor light-emitting devices are low power in nature that meet the trend, therefore are widely used as parts of a variety of light sources. The incorporation of semiconductor light-emitting devices with fiber-based light guiding technology renders light beams outputted from semiconductor light-emitting devices then are mixed and go through the fiber to make a light source based on electronic devices possible. For example, a projector employs the fiber-based light guiding technology to generate a light, which is the product of light beams generated by semiconductor light-emitting devices, as its light source for projection.

Please refer to FIG. 1 of a schematic diagram showing the structure of a prior art laser light source, titled as "fiber connecting method, laser apparatus and projection television" based on U.S. Pat. No. 6,954,571. The laser light source according to this prior art couples a plurality of laser light beams to a single-core fiber to form a coupled light source. A first laser generator 21, a second laser generator 22, a third laser generator 23, a fourth laser generator 24, a fifth laser generator 25, a sixth laser generator 26, and a seventh laser generator 27 generate a laser beam, respectively. The first laser generator 21 couples with a first light guiding device 31, the second laser generator 22 couples with a second light guiding device 32, the third laser generator 23 couples with a third light guiding device 33, the fourth laser generator 24 couples with a fourth light guiding device 34, the fifth laser generator 25 couples with a fifth laser guiding device 35, the sixth laser generator 26 couples with a sixth light guiding device 36, and the seventh laser generator 27 couples with a seventh light guiding device 37.

The first light guiding device 31 further couples with a first fiber 41, the second light guiding device 32 couples with a second fiber, the third light guiding device 33 couples with a third fiber 43, the fourth light guiding device 34 couples with a fourth fiber 44, the fifth light guiding device 35 couples with a fifth fiber 45, the sixth light guiding device 36 couples with a sixth finer 46, and the seventh light guiding device 37 couples with a seventh fiber 47. The first, second, third, fourth, fifth, sixth, and seventh fibers all connect to a coupling device 50. While each light guiding device guides its respective laser beam to the corresponding fiber, the coupling device 50 couples all light beams and outputs to a single-core fiber in order to mix all light beams together to form a coupled point light.

As a result, the output end of the single-core fiber outputs a quality point light source and through a condenser all point light sources from all single-core fibers could form a uniform light source, or other light sources as expected. Light beams in different colors could be mixed into a white light or lights in other colors in a single-core fiber without color deviations stemming from observing from different angles. However the energy of the light beams attenuates at the time of coupling. The more light beams of fibers are coupled into the single-core fiber, the more energy loss would take place. The energy loss for each fiber is estimated to be 0.5 dB while the directional coupler leads to 0.15 dB energy losses. Consequently, the total energy loss for the laser light source would be 3.5 dB.

SUMMARY OF THE INVENTION

It is therefore a primary objective of the present invention to provide a light source device capable of generating coupled lights in different colors from lights in different colors and then coupling those coupled lights to an output fiber while reducing the energy loss at the time of light couplings so that to lower power consumption and at the same time to have easier way of the dissipation of the generated heat.

In accordance with the claimed invention, a fiber-based light source device includes a plurality of first light-emitting devices for emitting a plurality of first lights, a plurality of second light-emitting devices for emitting a plurality of second lights, a plurality of third light-emitting devices for emitting a plurality of third lights, a plurality of first directional couplers for coupling the first lights in their order so as to generate a first coupled light, a plurality of second directional couplers for coupling the second lights in their order so as to generate a second coupled light, a plurality of third directional couplers for coupling the third lights in their order so as to generate a third coupled light, a fourth directional coupler for coupling the first coupled light and the second coupled light so as to generate a fourth coupled light, and a fifth directional coupler for coupling the third coupled light and the fourth coupled light so as to generate an output light source.

It is an advantage of the present invention that with the use of directional couplers light beams in three primary colors will be coupled to a fiber without too much of energy loss when light beams are coupling.

It is another advantage of the present invention that the amount of the light emitting of light-emitting devices for three primary colors is adjustable so as to render characteristics of the output light source such that the brightness and color temperature are adjustable also.

It is another advantage of the present invention that the power consumption could be limited and better heat dissipation could be obtained with the mechanism of having each light-emitting device to emit light beam in one of the three primary colors exclusively and in a sequential manner.

These and other objectives of the present invention will be no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
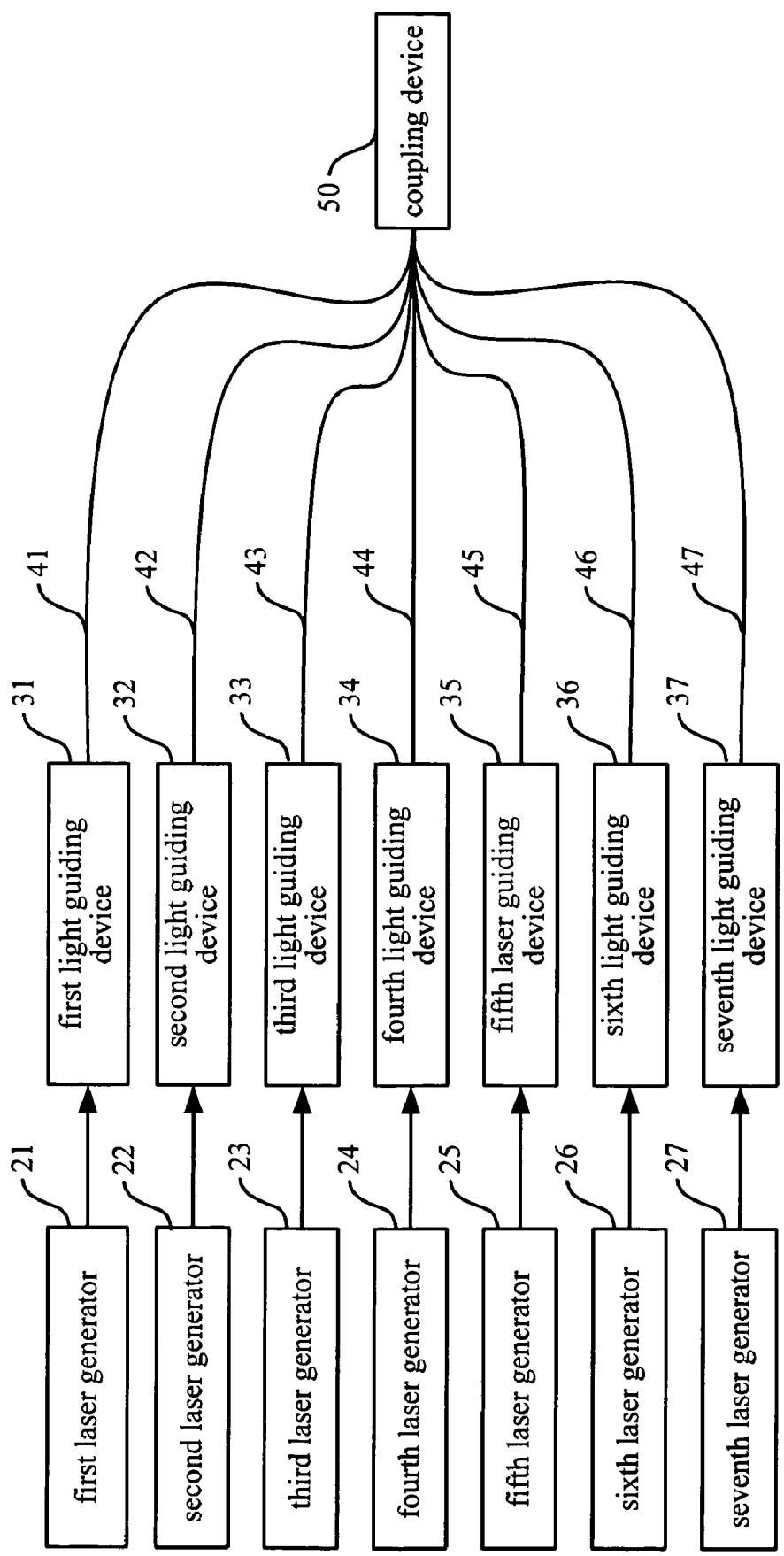
FIG. 1 is a schematic diagram of a laser light source device according to the prior art.
Figure 2:
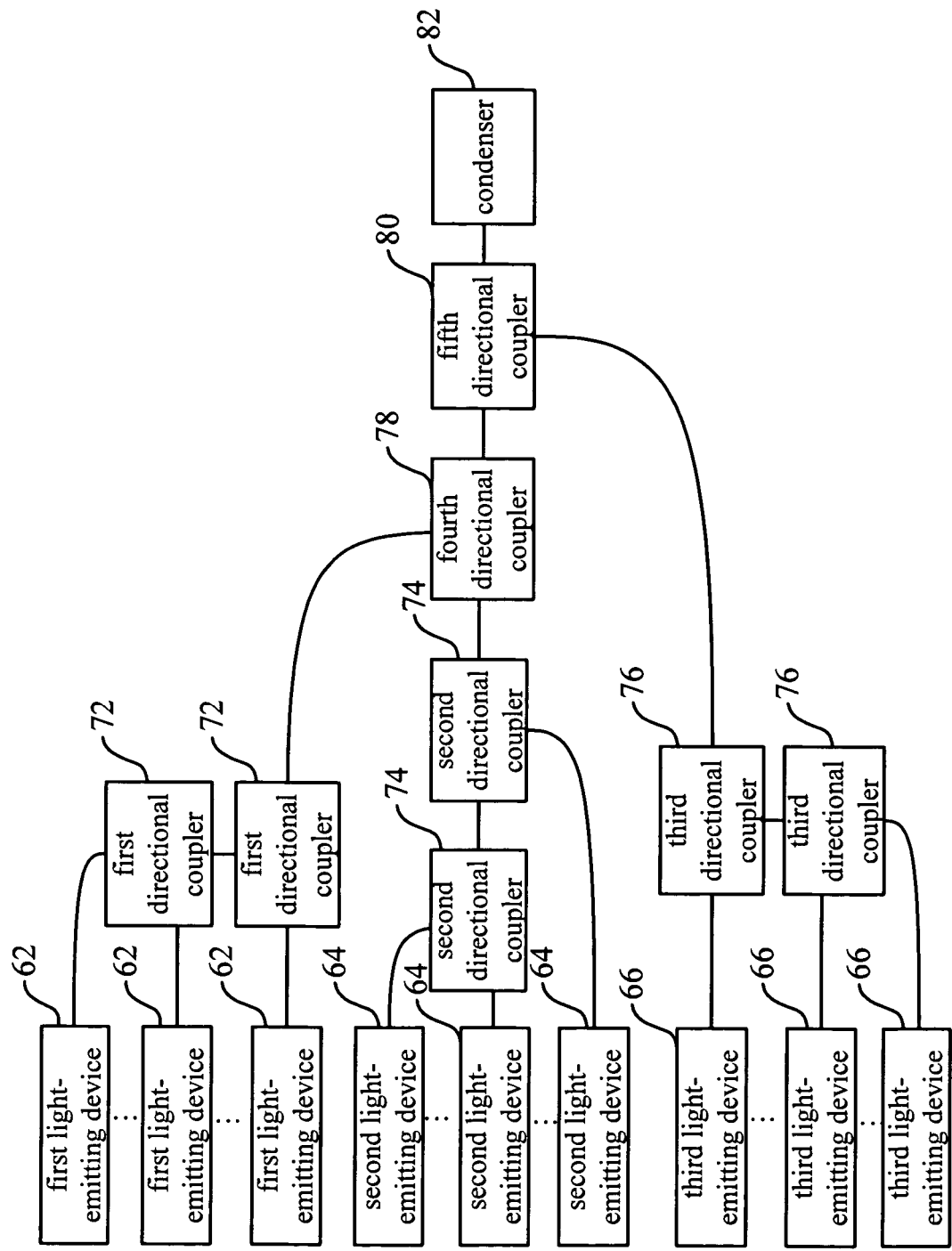
FIG. 2 is a schematic diagram of a preferred embodiment according to the present invention.

Please refer to FIG. 2 of a schematic diagram showing a preferred embodiment according to the present invention. A fiber-based light source device includes a plurality of first light-emitting devices 62, a plurality of second light-emitting devices 64, a plurality of third light-emitting devices 66, a plurality of first directional couplers 72, a plurality of second directional couplers 74, a plurality of third directional couplers 76, a fourth directional coupler 78, a fifth directional coupler 80, and a condenser 82. First light-emitting devices 62 are coupled into a first coupled light by the first directional couplers 72, second light-emitting devices 64 are coupled into a second coupled light by the second directional couplers 74, third light-emitting devices 66 are coupled into a third coupled light by the third directional couplers 76, the fourth directional coupler 78 couples the first coupled light and the second coupled light into a fourth coupled light, the fifth directional coupler 80 couples the third coupled light and the fourth coupled light into an output light source. The output light source is further received by a lens 82 to generate a face light source.

The first light-emitting device 62, the second light-emitting device 64, and the third light-emitting device 66 are semiconductor light-emitting devices, such as LED or RCLED. The first light-emitting device 62, the second light-emitting device 64, and the third light-emitting device 66 output single-color lights in each of three primary colors (red, blue, and green), respectively. The lens 82 is a condenser. The face light source from the lens 82 could be either an illumination light source or a back light source. The illumination light source is for indoor or outdoor illumination while the back light source is used in the display panel. The lens 82 is designed based on the fifth directional coupler 80 to have the face light source emitting the light in a uniform manner and with small light diffusion angles.

Moreover, the presence of directional couplers reduces the energy losses of the first lights, second lights, third lights, the first coupled light, the second coupled light, the third coupled light, and the fourth coupled light to less than 5 percents. In other words, having lights in any given two fibers coupled into another fiber will have at least 95 percents of the energy been reserved. The present invention reveals the way of coupling lights in different colors into a fiber in a sequential manner which avoids energy loss of having a plurality of lights converged into a fiber in the same time. Furthermore, due to the inherent small size of semiconductor devices, a fiber-based light source device built with the present invention has a smaller size accordingly.

Figure 3:
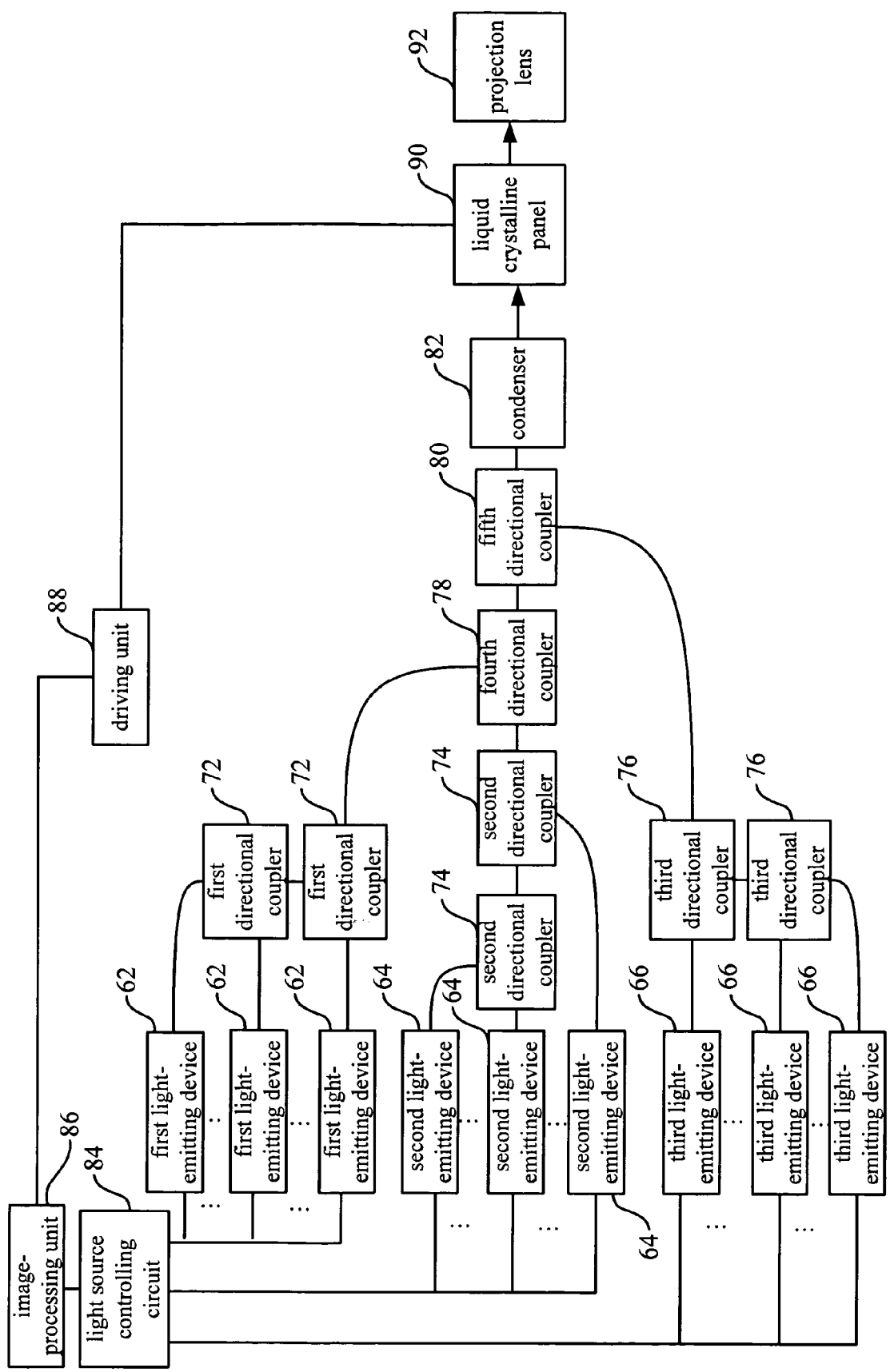
FIG. 3 is a schematic diagram of another preferred embodiment according to the present invention.

Please refer to FIG. 3 of a schematic diagram of another preferred embodiment according to the present invention. The primary difference between FIG. 3 and FIG. 2 is the installations of a light source controlling circuit 84, an image-processing unit 86, a driving unit 88, a liquid crystalline panel 90, and a projection lens 92. The fiber-based light source device serves as the light source for a projector while the light source controlling circuit 84 is coupled with first light-emitting devices 62, second light-emitting devices 64, and third light-emitting devices 66. The image-processing unit 86 connects to the light source controlling circuit 84 and the driving circuit 88 further connected to the liquid crystalline panel 90. The face light source from the lens 82 shows an image on the liquid crystalline panel 90 then the image will be projected upon a display through the projection lens 92.

The image-processing unit 86 receives an image signal or a television signal then converts the signal to a controlling signal for the light source controlling circuit 84 and converts the signal into a driving signal for the driving circuit 88 in accordingly. Thereafter, the light source controlling circuit 84 controls the characteristics of the first light-emitting devices 62, the second light-emitting devices 64, and the third light-emitting devices 66 according to the controlling signal. For example, the desired brightness and the demanded light color information carried in the controlling signal can determine the light strengths of light beams emitted from the first-emitting devices 62, the second-emitting devices 64, and the third-emitting devices 66 to adjust the brightness of the face light source from the lens 82 and to switch colors as expected. As one can see, with this arrangement the fiber-based light source device is capable to switch on or off the first-emitting devices 62, the second-emitting devices 64, and the third-emitting devices 66 freely via the light controlling circuit 84 by using the controlling signal produced from the image-processing unit 86 no need to turn on all light-emitting devices. This further reduces the power consumption of the entire light source device and facilitates the control of heat dissipation.

The first light-emitting devices 62, the second light-emitting devices 64, and the third light-emitting devices 66 are RCLED in three primary colors, respectively, which are surface-emitting semiconductor light-emitting devices with smaller energy losses when they are coupled with fibers. The inside and outside quantum efficiencies of RCLED are close to those of laser diode. The electro-optical transfer efficiency of RCLED is fairly high with the modulation frequency around 500 MHz. Light-emitting devices connect to corresponding directional couplers with plastic fibers while the two directional couplers connect to each other by the plastic fiber as well. The energy loss is 0.15 dB for coupling every light-emitting device to the fiber and to the directional coupler, respectively. As a result, the total energy loss for the light source device according to the present invention is about 0.65 dB with three semiconductor light-emitting devices serving as one light-emitting device.

In contrast with the prior art, the fiber-based light source device according to the present invention includes a plurality of first light-emitting devices, second light-emitting devices, and third light-emitting devices for emitting a plurality of first lights, second lights, and third lights, respectively. The present invention also includes a plurality of first directional couplers for coupling the first lights in their order so as to generate a first coupled light, a plurality of second directional couplers for coupling the second lights in their order so as to generate a second coupled light, a plurality of third directional couplers for coupling the third lights in their order so as to generate a third coupled light. The present invention further includes a fourth directional coupler for coupling the first coupled light and the second coupled light so as to generate a fourth coupled light, and a fifth directional coupler for coupling the third coupled light and the fourth coupled light so as to generate an output light source to serve as an illumination light source, back light source, or a projector light source. In the case of applying the present invention to the projector, a light source controlling circuit is further employed to control the first, the second, and the third light-emitting devices for not only adjusting the brightness and colors of the light source but also facilitating the heat dissipation by switching-off those not in use light-emitting devices.

Those skilled in the art will readily observe that numerous modifications and alterations of the device may be made while retaining the teachings of this invention. Accordingly, the above disclosure should be construed as limited only by the metes and bounds of the appended claims.

What is claimed is:

1. A fiber-based light source device, comprising:
   a plurality of first light-emitting devices for emitting a plurality of first lights;
   a plurality of second light-emitting devices for emitting a plurality of second lights;

a plurality of third light-emitting devices for emitting a plurality of third lights;

a plurality of first directional couplers for coupling the first lights in their order so as to generate a first coupled light;

a plurality of second directional couplers for coupling the second lights in their order so as to generate a second coupled light;

a plurality of third directional couplers for coupling the third lights in their order so as to generate a third coupled light;

a fourth directional coupler for coupling the first coupled light and the second coupled light so as to generate a fourth coupled light; and a fifth directional coupler for coupling the third coupled light and the fourth coupled light so as to generate an output light source.

2. The fiber-based light source device in claim 1 wherein the first light-emitting devices, the second light-emitting devices, and the third light-emitting devices are semiconductor light-emitting devices.

3. The fiber-based light source device in claim 1 wherein the first lights, the second lights, and the third lights are single-color lights in each of three primary colors, respectively.

4. The fiber-based light source device in claim 1 wherein the output end of the fifth directional coupler further has a lens placed for receiving the output light source in order to generate a face light source.

5. The fiber-based light source device in claim 4 wherein the lens is designed based on the output light source so as to generate the face light source emitting the light in an uniform manner and reduce the light diffusion angles of the face light source.

6. The fiber-based light source device in claim 4 wherein the fifth directional coupler further connects to an outputting fiber for outputting the output light source to the lens.

7. The fiber-based light source device in claim 4 wherein the lens is a condensing lens.

8. The fiber-based light source device in claim 4 wherein the face light source is an illumination light.

9. The fiber-based light source device in claim 8 wherein the face light source is a back light source.

10. A fiber-based light source device comprising:

a first light-emitting device for emitting a first light;

a second light-emitting device for emitting a second light;

a third light-emitting device for emitting a third light;

a first directional coupler for coupling the first light and the second light in order to generate a coupled light; and a second directional coupler for coupling the coupled light and the third light in order to generate an output light source.

11. The fiber-based light source device in claim 10 wherein the first light-emitting device, the second light-emitting device, and the third light-emitting device are a semiconductor light-emitting device, respectively.

12. The fiber-based light source device in claim 10 wherein the first light, the second light, and the third light are a single-color light in each of three primary colors.

13. The fiber-based light source device in claim 10 wherein the output end of the second directional coupler further has a lens placed for receiving the output light source in order to generate a face light source.

* * * * *